United States Patent [19]

Voegtlin

[11] Patent Number: 4,464,105
[45] Date of Patent: Aug. 7, 1984

[54] DEVICE FOR THE FINAL ELONGATION OF PIECES OF DOUGH TO A LONG LENGTH

[75] Inventor: Rene Voegtlin, Schirmeck, France

[73] Assignee: Mecatherm, France

[21] Appl. No.: 465,506

[22] Filed: Feb. 10, 1983

[30] Foreign Application Priority Data

Feb. 10, 1982 [FR] France .................. 82 02283
Nov. 12, 1982 [FR] France .................. 82 19111

[51] Int. Cl.³ .......................... A21C 3/02; A21C 11/00
[52] U.S. Cl. ................... 425/364 R; 99/353; 425/406
[58] Field of Search ................ 99/353, 441; 425/363, 425/364 R, 320, 335, 391, 392, 394

[56] References Cited

U.S. PATENT DOCUMENTS

| 776,731 | 12/1904 | Dietz | 425/332 |
| 786,042 | 3/1905 | Longcaric | 425/332 |
| 1,236,505 | 8/1917 | Van Houten | 425/332 |
| 1,642,693 | 9/1927 | Parsons | 425/364 |
| 1,674,229 | 6/1928 | Scruggs | 425/320 |
| 2,035,188 | 3/1936 | Quick | 425/364 |
| 2,750,899 | 6/1956 | Marasso | 425/320 |
| 3,543,698 | 12/1970 | Grubelnik | 425/364 R |
| 3,947,179 | 3/1976 | Kemper | 425/320 |
| 4,334,845 | 6/1982 | Tamminen | 99/353 |

FOREIGN PATENT DOCUMENTS 0015194 9/1980 European Pat. Off. ........ 425/364 R

Primary Examiner—Willard E. Hoag
Attorney, Agent, or Firm—Darby & Darby

[57] ABSTRACT

The invention relates to device for permanently elongating dough pieces to a great length starting from pieces of dough of a medium length, said elongation process being inserted in the automatic sequence of different phases of treatment in an industrial production line for long loaves of bread and comprising an elongating device treating simultaneously entire rows of pieces of dough which have already been pretreated in suitable equipment to a medium length to transfer them subsequently, after having imparted a long length to them, to a final rising chamber prior to their being baked.

16 Claims, 5 Drawing Figures

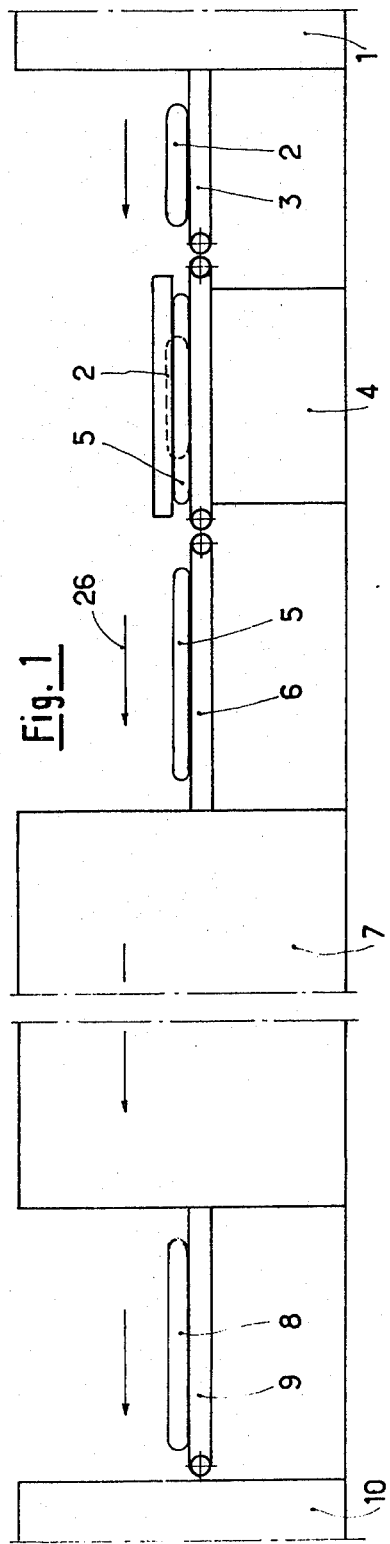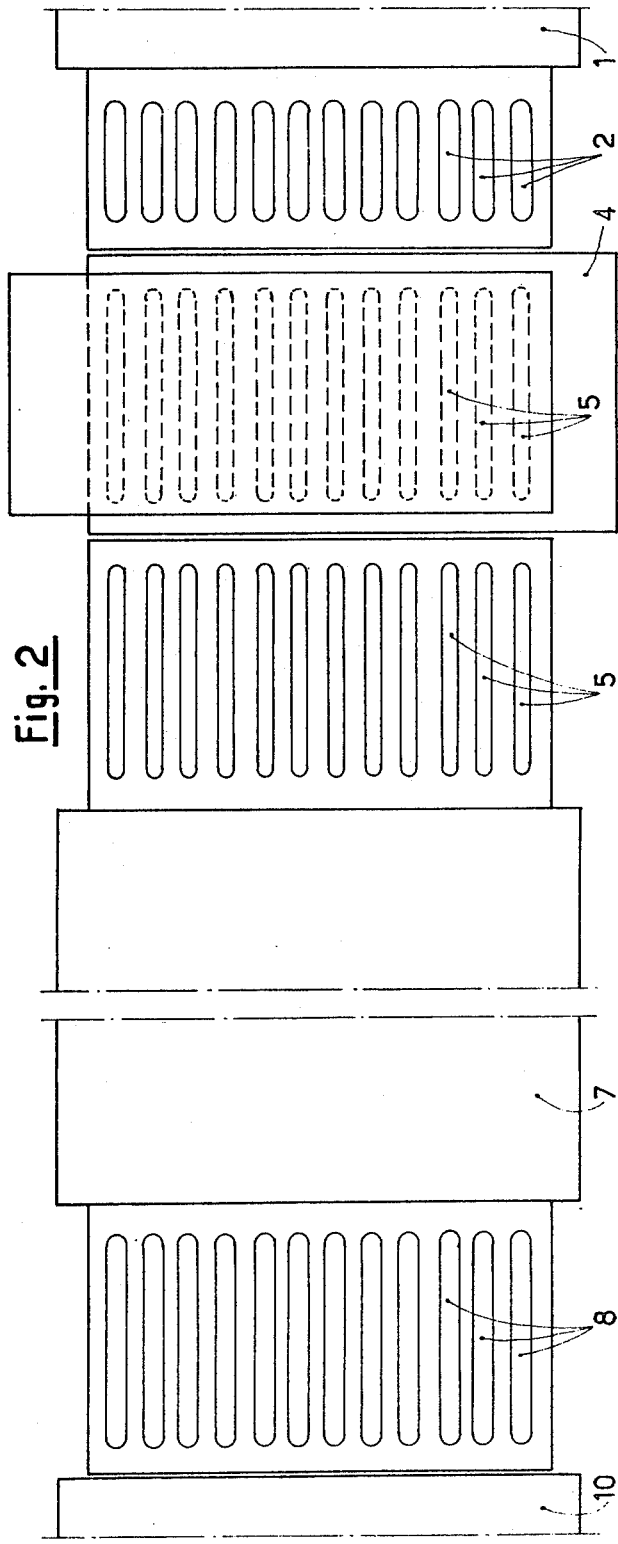

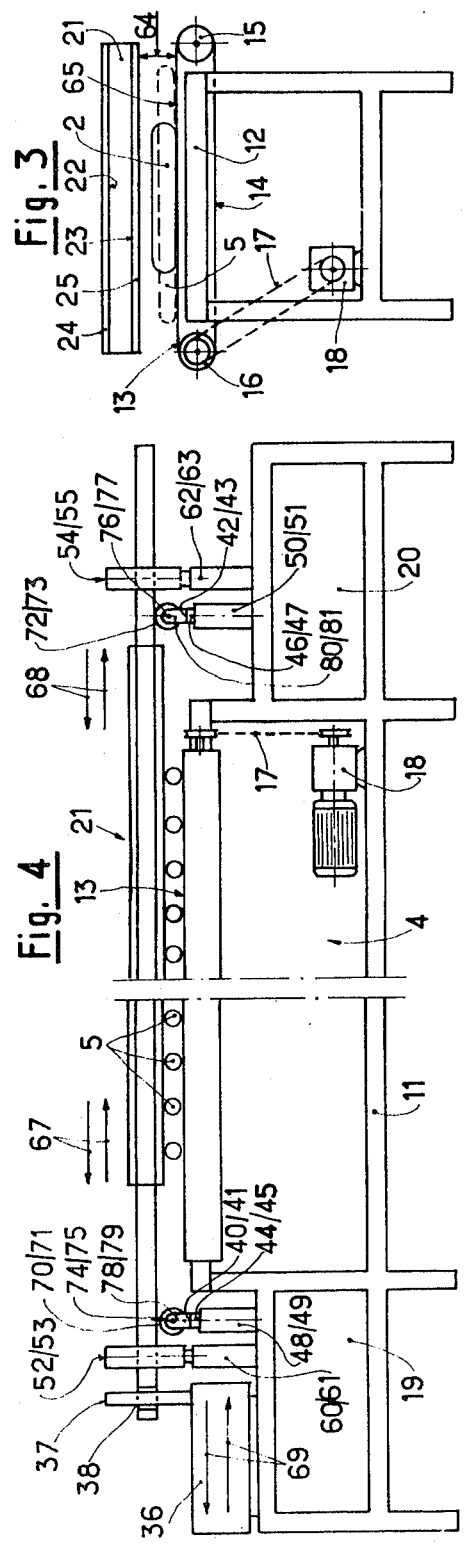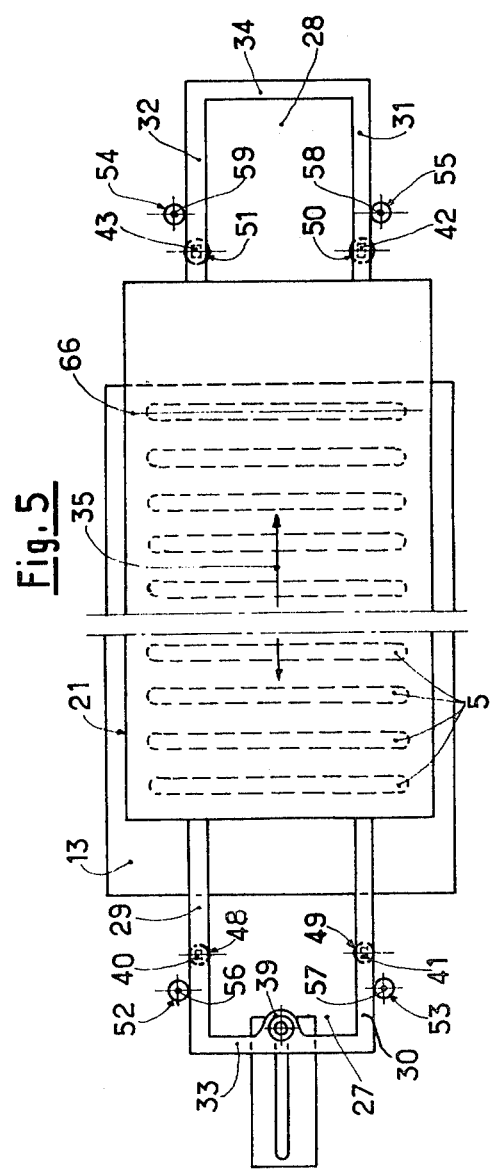

DEVICE FOR THE FINAL ELONGATION OF PIECES OF DOUGH TO A LONG LENGTH

The invention relates, on one hand, to a process and, on the other hand, to a device suitable for permanently elongating pieces of dough to a great length starting from pieces of prepared dough of medium length, such additional elongation being inserted into the automatic sequence of different phases of treatment in an industrial production line for long loaves of bread.

Machines capable of automatically working and placing pieces of dough of medium length of the order of fifty to sixty centimeters are known. Improved equipment has more recently been designed. A process is, for example, already known by French Pat. No. FR-A-2.153.887 for rolling and/or working the pieces of dough lengthwise, whereby the pieces of dough, possibly already elongated, are carried along on a lower conveyor plane and longitudinally rolled and/or worked in coordination with at least one higher conveyor plane. In accordance with this process, the pieces of dough are subjected during working or longitudinal rolling to two rolling forces acting upon them from the higher conveying plane and directed laterally outwards.

To give practical form to this process, an arrangement was devised characterized by the fact that, above a lower conveyor plane, at a distance progressively reduced along the direction of conveyance, there are two conveying planes driven in opposite directions outwards, almost transversely to the direction of conveyance.

Likewise known, from French Patent application FR-81.03573, is a process for depositing long pieces of dough on a support with a view to introducing them into a final rising chamber preceding baking in the industrial production of long loaves of bread.

According to this process, the pieces of dough are given their final length in the elongator, then they are kept by an anti-shortening assembly during transfer at their final length, then they are stabilized by freeing them of residual elastic constraint by means of a stabilizer giving the pieces of dough a perfect cylindrical turning and finally the long stabilized pieces of dough by means of a channel with opening flaps, are arranged on the oven feeder support of the final rising chamber.

To carry out this process, a mechanism was devised comprising, between the outlet from an elongator giving the pieces of dough into the final rising chamber prior to baking, an anti-shortening assembly which holds the pieces of dough arriving from the elongator, keeping them at their final length, and acting with a roller-stabilizer to relax the texture of the pieces of dough and eliminate residual mechanical constraints, prior to automatic deposit, by means of discharge facilities on the support introducing the long pieces of dough into the final rising chamber.

Using the devices referred to above, it is possible to elongate the pieces of dough to a length of seventy to eighty centimeters.

However, such known devices present several inconvenient aspects. In the first place, the pieces of dough are automatically worked and deposited individually. Moreover, the known devices give poor quality results and irregularities of length when compression adjustments are strained in order further to elongate the pieces of dough.

Now, today's market requires automatic installations for the manufacture of very long loaves, i.e. more than eighty centimeters long, and indeed the length of which required by the market may be as much as ninety centimeters.

In the present state of the art, manual operators can be employed further to elongate the pieces of dough of medium length emerging from the devices referred to above. Such workers operate on a working surface consisting of a conveyor belt, table or tray on which a series of pieces of dough of medium length have previously been placed.

The purpose of the present invention is to remedy such inconvenience. Accordingly, a process and a device are provided for mechanically effecting further elongation of the pieces of dough, not taken individually but in series, on an intermediate support fitted between (a) the equipment for working and depositing pieces of dough of medium length and (b) the final rising chamber, prior to baking the very long pieces of dough.

To this end, the invention relates to a process for finally elongating pieces of dough to a great length, starting from pre-worked pieces of medium length, characterized by the fact that a device for further elongation simultaneously processes whole series of pieces of dough arriving from an item of equipment for pre-working to medium length and subsequently transfers them fully elongated to the final rising chamber prior to baking in the industrial manufacture of very long loaves.

In accordance with this process, an entire row of pre-worked pieces of dough, brought into the device for further elongation by an endless belt, is submitted to the action of a number of reciprocating movements of the flat horizontal surface of a box resting freely upon the entire row of pieces of dough, said reciprocating movements being perpendicular to the longitudinal axis of the pieces of dough, causing the latter to roll in one direction then in the opposite direction on their support consisiting of the endless belt, which is stationary during the reciprocating movements of the box, the combined action of the pressure exerted by the weight of the box itself and that exerted by the rolling movements in alternating directions causing the final lengthening of the pieces of dough, the box sinking progressively as the diameter of the pieces of dough decreases when their length increases, the box being raised after a number of complete reciprocating movements and releasing the entire row of further elongated pieces of dough in their original positions for discharge by the endless belt to the final rising chamber.

The invention likewise relates to a device for carrying out the above-specified process characterized by the fact that it incorporates a stationary support at the treatment phase consisting of an endless belt, and a treatment box subjected to a number of reciprocating movements when acting upon the row of pieces of dough to be treated, the direction of such reciprocating movements being perpendicular to the longitudinal axis of the pieces of dough.

This device has a number of advantages and in particular makes possible industrial production of very long loaves obtained by the further elongation of rows of pieces of dough of medium length. Moreover, this device is also advantageous for the production of loaves of medium length. Indeed, it makes it possible to impose less strain upon the compression adjustments of traditional working equipment permitting more progressive treatment up to the ultimate length of the pieces of dough. The loaves obtained will thus be of better quality and more uniform.

The invention will be well understood by reference to the following description given as a non-limiting example and to the attached drawing in which:

FIG. 1 gives a side view of the arrangement of the device in accordance with the invention in an automatic bread-making line.

FIG. 2 gives a plan view of the arrangement of said device.

FIG. 3 gives an end view of the device for finally elongating the pieces of dough to full length, in accordance with the invention.

FIG. 4 represents a cross-sectional view of the device.

FIG. 5 represents a plan view of the device.

Reference is made to FIGS. 1 and 2.

The automatic bread-making line comprises an item of equipment 1 for working the dough and depositing the rows of pre-worked pieces of dough of medium length. This item of equipment 1 has an endless belt 3 passing the row of pieces of dough 2 from the working equipment 1 to a device 4 for further elongation. Such pieces of dough 2 (outlined in dotted lines) are converted into very long loaves 5. After the further elongation treatment, the latter are transferred on a feed belt 6 into a final rising chamber 7. The rows of very long pieces of risen dough 8 are transferred by a discharge belt 9 towards the baking oven 10.

The invention relates essentially to the further elongation device 4.

Reference is made to FIGS. 3 to 5.

The further elongation device comprises a substructure 11 acting as support for a frame 12 for an endless belt 13 the conveyor belt 14 of which passes round a driven drum 15 and a driving drum 16. The latter is driven, by means of a transmission 17, by a motive power such as geared motor 18. Such endless belt has a triple function: (a) it serves as a delivery mechanism for row 2 of pre-worked pieces of dough due be further elongated in the device 4; (b) it constitutes the working support for the further elongation treatment and finally (c) it is the discharge mechanism for the treated row 5 of pieces of dough.

On each side sub-structure 11 has two lateral structures 19, 20 acting as supports for various elements guiding and horizontally and vertically moving the treatment box 21. The latter consists of a very rigid structure in order to provide two completely flat horizontal surfaces 22, 23. These surfaces 22, 23 are fitted with two belts 24, 25. While it must be rigid, the treatment box 21 may not be too heavy in order to avoid crushing the pieces of dough 2. Such treatment box 21 may with advantage be made of a light alloy and have a hollow structure.

Treatment box 21 is laterally extended in relation to the direction of advance 26 (see FIG. 1) of the pieces of dough 3, 5 by two frames 27, 28 made up of members 29, 30, 31, 32 integral with the lateral extremities of said box and with cross-member 33, 34, interconnecting members 29, 30, and 31, 32.

Treatment box 21 is subjected to reciprocal movement, the direction of advance 26 of pieces of dough 3, 5, by means of reciprocating mechanism 36 integrally attached to one of lateral structures 19 of sub-structure 11. This reciprocating mechanism 36 has draw pin 37 passing through aperture 38 in drilled in bearing 39 which is integrally attached to frame 27 of box 21. The diameter of the aperture 38 is slightly larger than the diameter of draw pin 37 to enable pin 37 to slide without friction in aperture 38 as treatment box 21 moves vertically.

When the treatment box 21 is in the waiting position, members 29, 30, 31, 32 of frames 27, 28 rest upon heads 40, 41, 42, 43 of pistons 44, 45, 46, 47 of jacks 48, 49, 50, 51 affixed to the lateral structures 19, 20, said pistons 44 to 47 being subjected to vertical movement.

Moreover, the treatment box 21 is guided by swivel pins 52, 53, 54, 55 each pivoting about vertical axis 56, 57, 58, 59 supported by a bearing 60, 61, 62, 63 affixed to lateral structures 19, 20.

Owing to the fact that the treatment box 21 rests only upon heads 40 to 43 of pistons 44 to 47 of jacks 48 to 51, it is possible rapidly to turn over said treatment box 21. For this reason, should belt 25, covering inside surface 23 of treatment box 21, get wet or dirty following an intensive period of work on the pieces of dough, belt 24 covering the other surface 22 of box 21 can be utilized quickly by simply turning box 21 over.

As long as the treatment box 21 is in motion and the pieces of dough are subjected to rolling, in alternating directions, said pieces are not crushed by treatment box 21. However, as soon as the to and fro motion of treatment box 21 stops, whether by reason of an electric current stoppage or an operating failure of the bread making line due to some incident on said line such as a jam, the treatment box rests on the stationary pieces of dough. It is sufficient that the dough of the latter be too soft for said stationary pieces of dough to be crushed.

In addition, if the counter defining the number of to and fro strokes of the treatment box malfunctions, the treatment box must not continue to act on the pieces of dough because it would result in excessive elongation of said pieces of dough which would no longer have the desired diameter.

It is also necessary to consider the possibility that one row of pieces of dough for further elongation be incomplete by reason of a programming error or of the removal from the line of a piece of dough in order to test it to determine, for example, its exact weight, the texture of the dough, or any other characteristic.

Likewise, this risk of having an incomplete row of pieces of dough is practically a certainty at the end of the work where the line of industrial manufacture of long loaves of bread must be emptied before the final stoppage. It is in effect very problematic to have for the last elongation a number of pieces of dough which constitute exactly a complete row.

This inconvenience is also present during phases of production transition where the elongation device continues its cyclic work when no piece of bread, intentionally or not, is disposed between the treatment box and the endless belt.

To this effect, heads 40, 41, 42, 43 of pistons 44, 45, 46, 47 of jacks 48, 49, 50, 51 comprise checks having adjustable levels 70, 71, 72, 73, on which rest in waiting position side members 29, 30, 31, 32 of treatment box 21. Abutments 70, 71, 72, 73 are advantageously formed of rollers pivoting around a horizontal axis 74, 75, 76, 77 transversely disposed in relation to the direction of reciprocating motion of treatment box 21. Horizontal axes 74, 75, 76, 77 are supported by yokes 78, 79, 80, 81 integral with jack (48, 49, 50, 51) piston (44, 45, 46, 47) heads 40, 41, 42, 43.

According to another embodiment of the invention, the two surfaces 22, 23 may consist of a sleeve which, to provide a fresh working surface, would just have to be given half a turn. For this purpose, the box would have to be fitted with two drums comparable to those of endless belt 13.

According to another embodiment, a second reciprocating movement mechanism is added, the pin of which interacts with a second aperture in cross-member 34 of a second frame 28. The second reciprocating movement mechanism operates in synchronization with the first reciprocating movement mechanism 36. This embodiment makes it possible to eliminate the swivel pins 52 to 55. This would have the advantage of eliminating friction between said swivel pins 52 to 55 and the members 29 to 32 frames 27, 28 both during reciprocal movements of the box 21 and as box 21 shifts vertically.

Operation of the device is as follows:

When box 21 is in the waiting position, heads 40 to 43 of pistons 44 to 47 of the jacks 48 to 51 are in a sufficiently high position to ensure that gap 64 between the lower horizontal surface 23 of box 21 and the upper surface 65 of conveyor 14 of endless belt 13 is greater than the initial diameter of the pieces of dough 2 due to be treated. Accordingly, the pieces of dough 2 to be treated may be readily introduced into the device for further elongation 4 by the simultaneous forward movement of endless belt 13. After the row of pieces of dough 2 to be treated has been introduced, i.e. after completion of the endless belt 13, pins 44, 45, 46, 47 are lowered by a certain height corresponding to the difference in diameter of the pieces of dough before and after the treatment. When the treatment reaches its end, members 29, 30, 31, 32 of treatment box 21 resume contact with abutments 70, 71, 72, 73 and in order to avoid their being torn away by the movement of the treatment box 21, abutments 70, 71, 72, 73 are composed of rollers such as described above.

The descending course of pistons 44, 45 46, 47 is a function of the final diameter of the elongated pieces of dough. However, treatment box 21 carries a constant weight independent of the nature of the dough and/or dimensions of the dough piece diameter 5. For this reason, the level of abutments 70, 71, 72, 73 is variable according to the final diameter of the elongated pieces of dough.

In addition, in case of sudden stoppage of treatment box 21, and when the dough of the pieces of dough is too soft, weighing down of treatment box 21 is limited by said abutments 70, 71, 72, 73.

As soon as the jacks have been finally raised, the endless belt 13 is set in motion by the program control, discharging the further elongated pieces of dough 5 towards the final rising chamber 7, thus clearing the device for further elongation for a fresh row of pieces of dough to be treated 2.

What is claimed is:

1. Apparatus for elongating plural dough pieces at a time, comprising: an intermittantly movable but (13) which is stationary during elongation of the dough, a box for rolling said dough and means to reciprocate said box transversely of said belt while said box rests upon a row of pieces of dough to be elongated, the direction of reciprocation being perpendicular to the longitudinal axis of said dough pieces.

2. A device in accordance with claim 1, wherein the treatment box (21), has at least one perfectly flat horizontal surface (23) covered by a belt (25), comprises two lateral frames (27, 28) made of members (29 to 32) integrally connected to the lateral ends of the box (21) and to cross-members (33, 34) interconnecting said members (29 to 32).

3. A device in accordance with claim 1, wherein the treatment box (21) has two horizontal surfaces (22, 23) fitted with a belt (24, 25) making the box reversible.

4. A device according to claim 3, characterized in that the treatment box comprises a constant weight independent of the nature of the dough and/or the dimensions of the diameter of the pieces of dough (5).

5. A device in accordance with claim 3 or 4, wherein at least one cross-member (33) has a bearing (39) with a hole (38) through which passes vertically a draw pin (37) of a reciprocating movement mechanism (36) imparting reciprocating movement to the box (21).

6. A device in accordance with claim 5, wherein the hole (38) has a diameter greater than that of the draw pin (37) to ensure that the box (21) slips without friction along the draw pin (37).

7. A device in accordance with claim 3, comprising at least one reciprocal movement mechanism (36) driving the treatment box (21) by means of a draw pin (37) sliding freely in the orifice (38), so that, after the heads (40 to 43) of the pistons (44 to 47) of the jacks (48 to 51) are simultaneously lowered, the treatment box (21) may rest upon the pieces of dough during its reciprocal movements.

8. A device in accordance with claim 3, having four swivel pins (52 to 55) each pivoting about a vertical axis (56 to 59) supported by a bearing (60 to 63) affixed to lateral structures (19, 20) of a frame (11) which acts as a support to the endless belt (13), such swivel pins (52 to 55) acting with the members (29 to 32) in the end frames (27, 28) of the treatment box (21) to guide the box during its reciprocal movements, while leaving it to rest upon the pieces of dough due to be treated (2).

9. A device in accordance with claim 3, 7 or 8, comprising two recipzed by the fact that it includes two reciprocal movement mechanisms (36) acting with each end frame (27, 28), making it possible to eliminate the guiding swivel pins (52 to 55).

10. A device in accordance with claim 3, comprising a sub-structure (11) acting as a support for the endless belt (13) and having on each side a lateral structure (19, 20) on which there are jacks (48 to 51) fitted vertically having pistons (44 to 47), of which the heads (40 to 43) act with the treatment box (21) to move the latter vertically.

11. A device in accordance with claim 10, wherein the jacks being subjected to simultaneous and identical vertical movement have a length of travel of the order of the gap (64) between the lower horizontal surface (23) of the box (21) and the upper surface (65) of the endless belt (13) so that the treatment box (21) rests on the pieces of dough due to be treated (2).

12. A device in accordance with claim 10 or 11, wherein the heads (40 to 43) of the pistons of the jacks are high enough to ensure that the gap is greater than the initial diameter of the pieces of dough to be treated.

13. A device in accordance with claim 3 or 10, comprising a treatment box subjected to reciprocating movement and having two frames composed of side members and transverse members and of a lateral carcass on which the jacks are vertically affixed, wherein heads (40, 41, 42, 43) of pistons (44, 45, 46, 47) of jacks (48, 49, 50, 51) comprise abutment of adjustable level (70, 71, 72, 73) limiting the downward movement of treatment box (21) when it acts on the pieces of dough to be elongated (5).

14. A device according to claim 13, wherein said abutments are horizontally pivoting rollers.

15. A device according to claim 14 characterized wherein each of said abutments comprise a horizontal axis (74, 75, 76, 77) transversely disposed in relation to the reciprocating movement of the treatment box.

16. A device according to claim 15, wherein each of said catches comprises a yoke (78, 79, 80, 81) serving to support the horizontal axes 76, 77) and integral with the heads of the pistons of the jacks.

* * * * *